United States Patent [19]

Hensley et al.

[11] Patent Number: 4,884,782
[45] Date of Patent: Dec. 5, 1989

[54] MEANS FOR SEPARABLY ATTACHING SOLENOID TO VALVE

[75] Inventors: Thomas E. Hensley, Barhamsville; Gary L. Slack, Newport News, both of Va.

[73] Assignee: Siemens-Bendix Automotive Electronics L.P., Troy, Mich.

[21] Appl. No.: 339,022

[22] Filed: Apr. 14, 1989

[51] Int. Cl.⁴ .............................................. F16K 31/06
[52] U.S. Cl. .............................. 251/129.15; 335/260; 335/278
[58] Field of Search .......................... 251/129.15, 905; 335/260, 278

[56] References Cited

U.S. PATENT DOCUMENTS 3,447,773  6/1969  Huber .............................. 335/260 X
3,609,610  9/1971  Flentge ................................ 335/278
4,817,914  4/1989  Pick et al. ..................... 251/129.15

FOREIGN PATENT DOCUMENTS 2809468  9/1979  Fed. Rep. of Germany ...... 335/278

Primary Examiner—Arnold Rosenthal
Attorney, Agent, or Firm—George L. Boller; Russel C. Wells

[57] ABSTRACT

A solenoid valve assembly in which the solenoid and valve are axially fitted together. The solenoid comprises a cylindrical housing having an axial slot running along its entire length to allow the housing to be resiliently circumferentially expanded. The valve body has a cylindrical axial surface over which an axial end portion of the housing is fitted. Just beyond this cylindrical axial surface is a narrow groove. The cylindrical housing of the solenoid is provided with preformed stakes in its end edge which fit into this narrow groove to retain the solenoid end valve together in assembly. The invention is particularly advantageous where there is a limited axial length for the cylindrical housing of the solenoid to fit onto the valve body. The invention provides adequate retention in assembly, a sufficient area for magnetic flux that passes between the solenoid housing and the valve body, and the ability to easily disassemble the solenoid from the valve when such disassembly is desired.

4 Claims, 1 Drawing Sheet

MEANS FOR SEPARABLY ATTACHING SOLENOID TO VALVE

BACKGROUND AND SUMMARY OF THE INVENTION

This invention relates generally to solenoid valves. More specifically it relates to a means for separably attaching a solenoid to a valve which provides for secure retention of the two in assembly, yet allows the two to be readily separated for disassembly.

The invention arises in the context of a solenoid valve assembly in which the solenoid and the valve body are axially fitted together, and the valve body forms a part of the magnetic circuit. In a solenoid valve assembly of this type where the axial extent of the fit between the solenoid and the valve body is limited, a problem may arise if there is insufficient space to provide for both the magnetic circuit and the mechanical attachment of the solenoid to the valve body. The present invention is directed to a construction that provides a solution for this problem. The construction that embodies the present invention also is capable of providing a sufficiently high resistance to the solenoid being pulled apart from the valve body, yet provides the capability for easy disassembly of one from the other when disassembly is intended.

Briefly, the invention comprises a construction in which a solenoid has a magnetically conductive cylindrical housing that is fitted over a cylindrical axial surface of the valve body. The housing has an axial slot running along its entire length that allows the housing to be resiliently circumferentially expanded. The cylindrical housing is sized to circumferentially grip the cylindrical axial surface of the valve body and the axial extent the cylindrical axial surface of the valve body is long enough to provide an adequate space for the magnetic flux passing between the solenoid and the valve body. The valve body is provided with a narrow cylindrical groove immediately behind its cylindrical axial surface. The cylindrical housing of the solenoid has a plurality of discrete radially inwardly directed stakes formed at the end edge of the housing and these stakes fit into the narrow groove in the valve body so as to be in an interference relationship with a shoulder that exists between the cylindrical axial surface of the valve body and the groove in the valve body. The construction provides more than adequate retention of the solenoid on the valve body yet when it is desired to separate the two, such separation may be easily preformed in the following manner. A tool such as a screwdriver is inserted into the axial slot in the cylindrical housing of the solenoid and rotated to slightly circumferentially expand the housing. This expansion enables the solenoid to be pulled axially off the valve body with a much lower force than the normal assembled retention force. The ability to separate the solenoid from the valve assembly is desirable for repair operations. Reassembly of the solenoid to the valve body is accomplished by aligning the two parts and pushing them together. During this process the housing of the solenoid in effect snaps onto the valve body.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
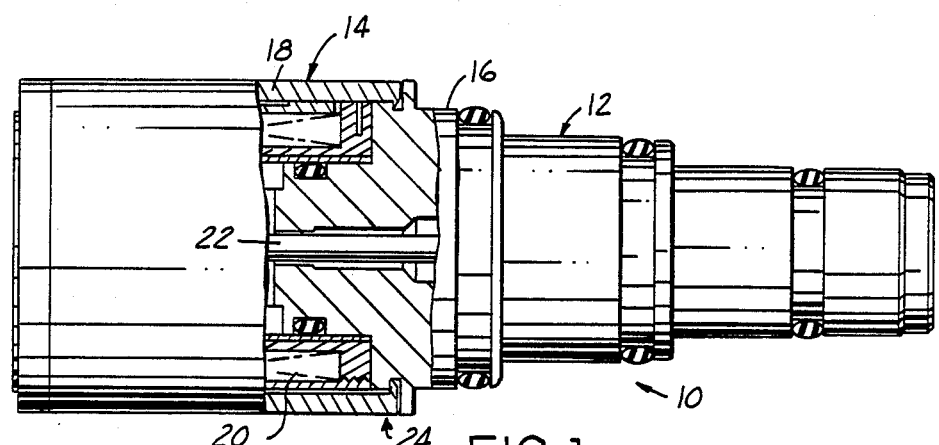
FIG. 1 is a view of a solenoid valve assembly embodying principles of the present invention with a portion broken away to reveal the manner of retention.

In FIG. 1 a solenoid valve assembly 10 is seen to comprise a valve portion 12 and a solenoid portion 14. The valve portion 12 and solenoid portion 14 are axially fitted together in assembly.

Valve portion 12 comprises a valve body 16 that is formed of a magnetically conductive material. Solenoid portion 14 comprises a magnetically conductive cylindrical housing 18.

Figure 2:
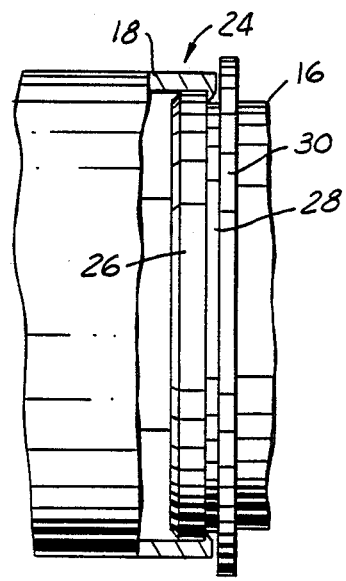
FIG. 2 is a view illustrating the retention in greater detail.
Figure 3:
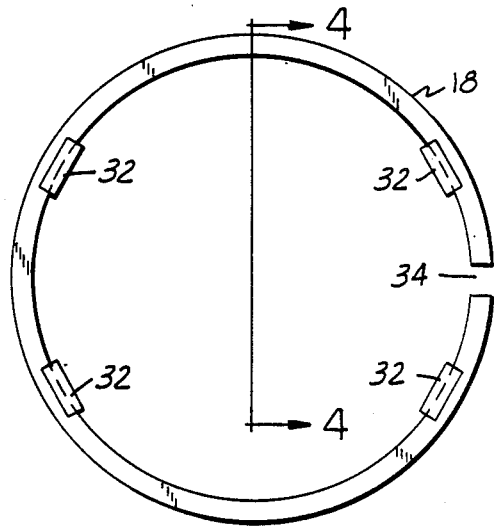
FIG. 3 is an axial end view of the solenoid housing shown by itself.
Figure 4:
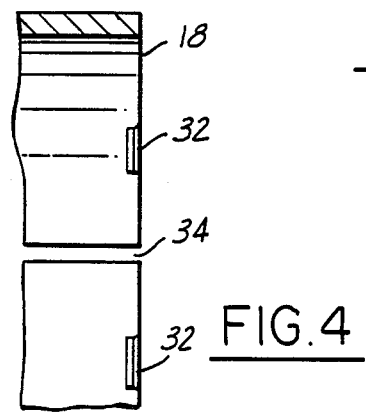
FIG. 4 is a fragmentary sectional view taken in the direction of arrows 4—4 in FIG. 3.

Solenoid portion 14 further includes a coil 20 that when energized creates a magnetic flux that passes through housing 18 and valve body 16 to operate an armature 22 that controls the flow through valve portion 12. The location in which the magnetic flux passes between housing 18 and valve body 16 is in the vicinity indicated by the reference numeral 24. It is also in this same vicinity that the solenoid portion 14 is retained to the valve portion 12. FIGS. 2, 3 and 4 illustrate greater detail. The valve body 16 has a cylindrical axial surface 26 over which the axial end portion of housing 18 is fitted. Immediately beyond surface 26 is a narrow cylindrical groove 28 in valve body 16, and immediately behind groove 28 is a cylindrical flange 30.

Housing 18 is sized to circumferentially grip surface 26 when the solenoid portion 14 is assembled to valve portion 12. The axial dimension of surface 26 is sufficient so that there is adequate area for the flux passing between housing 18 and valve body 16 when solenoid 20 is energized. In addition, the end edge of housing 18 is provided with several preformed stakes that fit into groove 28 when the solenoid portion is assembled to the valve portion. FIG. 3 shows that there are four stakes 32 formed in the end edge of housing 18. Additionally, the housing 18 has an axial slot 34 running its entire length that enables the housing to be slightly resiliently circumferentially expanded. Because the stakes 32 are preformed in the end edge of housing 18, groove 28 can be made quite narrow. Thus the overall axial length of surface 26 and groove 28 can be quite limited. Stated another way, the illustrated construction can provide for adequate retention of the solenoid portion to the valve portion and a sufficient area for magnetic flux that passes between the two, even when the available axial space for surface 26 and groove 28 is quite limited.

FIGS. 1 and 2 show the valve portion 12 and the solenoid portion 14 in assembly. In this condition the two exhibit an adequate resistance to being pulled apart axially so that they are considered to be adequately retained. Yet when it is desired to disassemble the two such as for repair purposes, disassembly is easily accomplished by inserting the tip of a screwdriver into slot 34, twisting the screwdriver to slightly circumferentially expand housing 18, and then pulling the solenoid portion from the valve body portion with a much reduced force.

Assembly of the solenoid portion to the valve portion is accomplished by axially aligning the two and then pushing them together so that the axial end of housing 18 that contains stakes 32 passes over surface 26 and lodges the stakes 32 in groove 28. At the same time flange 30 forms an axial abutment for the end of housing 18.

The edge stakes are formed in the end edge of housing 18 by conventional metal forming procedures. The illustrated configuration of FIG. 3 shows that the edge stakes 32 are symmetrically arranged to either side of slot 34 with two being located 30 degrees away from slot 34 and the other two 150 degrees away.

While a preferred embodiment of the invention has been disclosed, it will be appreciated that principles are applicable to other embodiments.

What is claimed is:

1. In a solenoid valve assembly which comprises a magnetically conductive valve body and a solenoid assembly that are axially fitted together and wherein the solenoid assembly comprises a magnetically conductive cylindrical housing having an axial slot along its entire length to allow the housing to be resiliently circumferentially expanded, and the valve body comprises a cylindrical axial surface over which an axial end portion of the housing is fitted, the magnetic flux issued by said solenoid passing between said axial end portion of said housing and said cylindrical axial surface of said valve body, the improvement for retaining said housing to said valve body while still providing adequate area for the flux passing between the two which comprises, said axial end portion of said housing being sized to circumferentially grip said cylindrical axial surface, said valve body having a cylindrical groove immediately behind said cylindrical axial surface, and a plurality of discrete radially inwardly directed stakes formed at the end edge of said axial end portion, said stakes fitting into said groove so as to be in interference relationship with a shoulder that exists between said cylindrical axial surface and said groove.

2. The improvement set forth in claim 1 in which said stakes, in axial view, are arranged symmetrically with respect to said slot.

3. The improvement set forth in claim 2 in which there are four such stakes, two at 30 degrees from the slot and two at 150 degrees from the slot.

4. The improvement set forth in claim 1 in which said groove has an axial dimension less than the axial dimension of said cylindrical axial surface and including a flange around said valve body just beyond said groove, said flange forming an axial abutment for the end edge of said axial end portion.

* * * * *